(12) United States Patent
Leblang et al.

(10) Patent No.: US 10,491,598 B2
(45) Date of Patent: Nov. 26, 2019

(54) MULTI-FACTOR AUTHENTICATION TO ACCESS SERVICES

(71) Applicant: Amazon Technologies, Inc., Seattle, WA (US)

(72) Inventors: Jonathan Alan Leblang, Menlo Park, CA (US); Collin Charles Davis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 482 days.

(21) Appl. No.: 15/199,661

(22) Filed: Jun. 30, 2016

(65) Prior Publication Data

US 2018/0007060 A1    Jan. 4, 2018

(51) Int. Cl.
| | |
|---|---|
| *G06F 17/00* | (2019.01) |
| *H04L 29/06* | (2006.01) |
| *G06F 21/35* | (2013.01) |
| *H04W 12/06* | (2009.01) |

(Continued)

(52) U.S. Cl.
CPC ............ *H04L 63/105* (2013.01); *G06F 21/35* (2013.01); *H04L 63/0853* (2013.01); *H04L 63/0861* (2013.01); *H04L 63/107* (2013.01); *H04L 63/20* (2013.01); *H04W 12/06* (2013.01);

(Continued)

(58) Field of Classification Search
CPC ........... H04L 2463/082; H04L 63/0876; H04L 63/105; H04L 63/0861; H04L 63/107; H04L 63/20; H04L 63/0853; H04N 2201/3239; G06F 21/32; G06F 21/35; G06Q 20/40145; H04W 48/16; H04W 12/06; H04W 84/18
See application file for complete search history.

(56) References Cited

U.S. PATENT DOCUMENTS

| | | | |
|---|---|---|---|
| 2006/0262908 A1* | 11/2006 | Chambers | ............. H04M 3/385 379/88.01 |
| 2009/0164796 A1* | 6/2009 | Peirce | ..................... G06F 21/32 713/186 |

(Continued)

OTHER PUBLICATIONS

International Search Report for International Application No. PCT/US2017/035059 dated Jul. 28, 2017, 5 pages, Netherlands.

*Primary Examiner* — Trong H Nguyen
(74) *Attorney, Agent, or Firm* — Thorpe North & Western, LLP

(57) ABSTRACT

A technology is provided for using a multi-factor authentication process to access services in a computing service environment. One or more policies can be defined for allowing access to one or more services and/or resources associated with a service provider environment according to an authenticated identity. A device, detected by a voice-capturing endpoint within a defined geographical location, may be authenticated according to a unique identification (ID). Voice data received from the voice-capturing endpoint can be authenticated. The authenticated identity can be established according to the authenticated device and the authenticated voice data. A command, received via a voice command from the voice-capturing endpoint, may be issued with the authenticated identity to access the one or more services and/or resources associated with the service provider environment according to the plurality of policies.

20 Claims, 9 Drawing Sheets

(51) Int. Cl.
*H04W 48/16* (2009.01)
*H04W 84/18* (2009.01)

(52) U.S. Cl.
CPC ....... *H04W 48/16* (2013.01); *H04L 2463/082* (2013.01); *H04W 84/18* (2013.01)

(56) References Cited

U.S. PATENT DOCUMENTS

| | | | |
|---|---|---|---|
| 2009/0193507 A1* | 7/2009 | Ibrahim | H04L 63/0807 |
| | | | 726/9 |
| 2012/0245941 A1 | 9/2012 | Cheyer | |
| 2013/0067551 A1* | 3/2013 | Frew | H04L 9/3215 |
| | | | 726/7 |
| 2013/0174053 A1* | 7/2013 | Torrenegra | H04L 51/32 |
| | | | 715/752 |
| 2014/0109210 A1* | 4/2014 | Borzycki | A63F 13/213 |
| | | | 726/7 |
| 2014/0372308 A1* | 12/2014 | Sheets | G06Q 20/40 |
| | | | 705/44 |
| 2015/0161370 A1* | 6/2015 | North | G07C 9/00158 |
| | | | 726/5 |
| 2017/0019402 A1* | 1/2017 | Kulkarni | H04L 63/0807 |
| 2017/0094057 A1* | 3/2017 | Naiga | H04M 3/493 |
| 2017/0245101 A1* | 8/2017 | Chandrasekaran | G01S 1/04 |

* cited by examiner

MULTI-FACTOR AUTHENTICATION TO ACCESS SERVICES

BACKGROUND

Computing systems may be found in the workplace, at home, or at school. Computing systems may include computing and data storage systems to process and store data. Some computing systems have begun offering centralized, virtualized computing options (e.g., service provider environments) that may reduce overall costs, improve availability, improve scalability, and reduce time to deploy new applications and computing functionality. For example, some computing systems may act as a service that provides virtual computing, virtual storage, virtual networking and other virtual services as purchased for variable periods or on a pay-per-use basis (e.g., pay for a certain amount of API (application program interface) transactions or bandwidth) from large pools of re-purposable, multi-tenant computing resources or services.

Many computing systems also include the use of and access to virtualized services or other similar services, via the internet, which continue to expand and diversify. Many of these computing systems, such as, for example, cell phones, tablets, voice activated devices, home automation systems, and other devices can now communicate with services on the internet that provide functionality or computing power not available on the local device. However, security challenges may arise when one or more computing systems attempt to communicate with the services that provide the virtual computing, virtual storage, virtual networking and other virtual services as purchased for variable periods or on a pay-per-use basis from large pools of re-purposable, multi-tenant computing resources or services. Thus, the security and performance of the service provider environment may be addressed in the context of the computing systems that are in communication with the service provider environment.

DETAILED DESCRIPTION

Figure 1A:
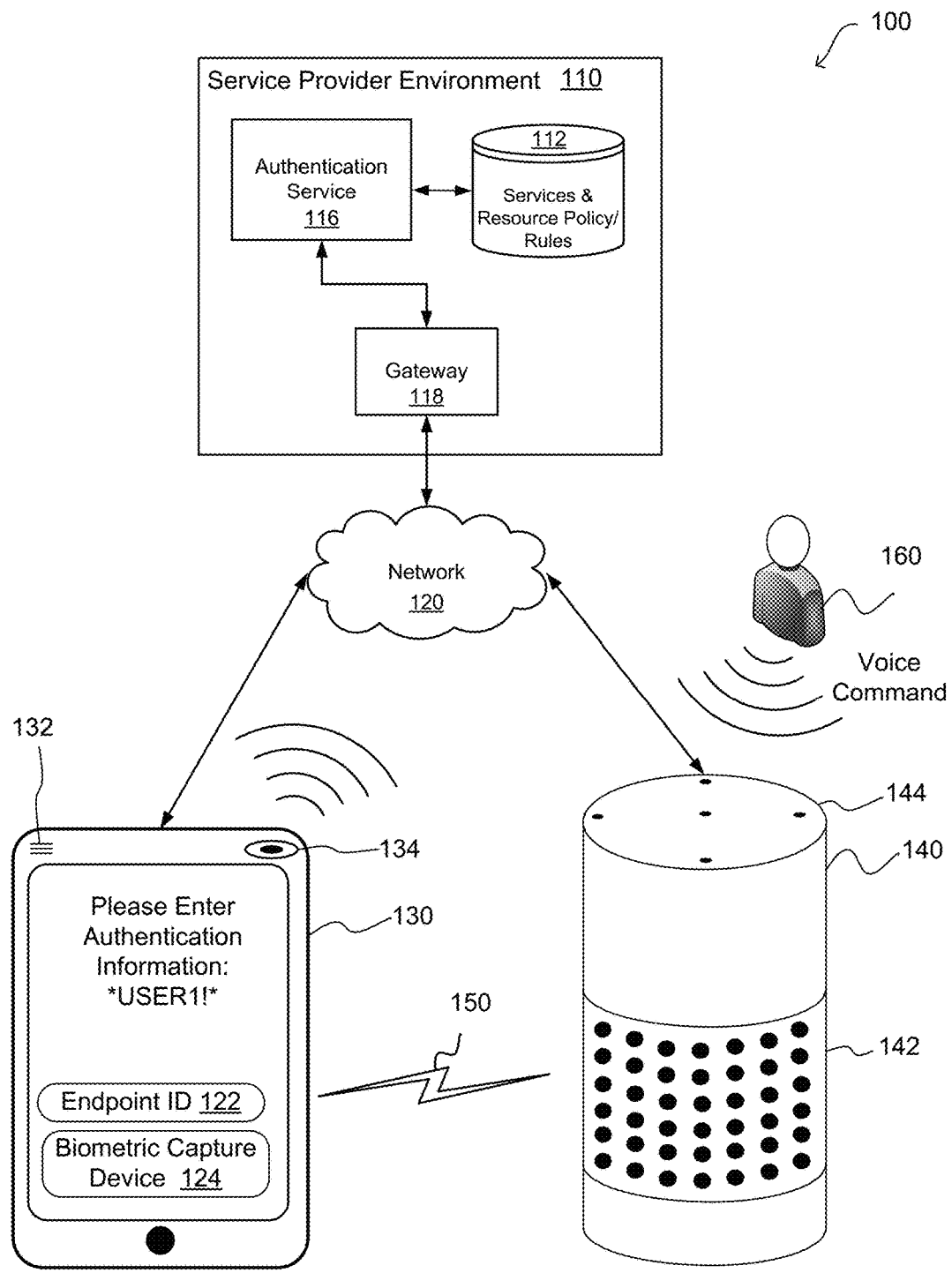
FIG. 1A illustrates a system using a multi-factor authentication process to access services in a service provider environment according to an example of the present technology.

The present technology provides a multi-factor authentication process to access services in a computing service environment. One or more rules and/or policies can be defined for allowing access to one or more services and/or resources available in a service provider environment as allowed by an authenticated identity (e.g., an authentication token). In one aspect, the services and/or resources (e.g., "skills") provided may include, for example, but may not be limited to, scheduling conference calls, identifying a speaker during a conference call, acting as a scheduling assistant, providing calendaring services, recording a meeting, accessing calendars, phone directories, or e-mail, creating, scheduling, and/or modifying tasks, and so forth.

A device, detected as being within a defined geographical proximity of a voice-capturing endpoint (e.g., the voice-capturing endpoint may include a voice-capturing endpoint or the voice-capturing endpoint may detect a beacon from the device), may be authenticated according to a unique identifier (ID) such as a cell phone's MIN (mobile identification number) or another device ID. In one aspect, the voice-capturing endpoint may be an endpoint having voice recognition technology housed within the endpoint. Further, the voice-capturing endpoint may be a virtual assistant that can detect a voice command and execute one or more services, and/or functions in relation to the voice command. The voice-capturing endpoint may also be a computer, a laptop, a tablet, a television, a smart phone, a set top box, speaker, or any device capable of detecting a voice. Voice data received from the voice-capturing endpoint may also be used in the authentication process by the service provider environment. An authenticated identity may be established according to the authenticated device (e.g., a mobile device), an authenticated voice-capturing endpoint, and/or authenticated voice data. A command, received using a voice command via the voice-capturing endpoint, may be sent to the service provider environment with the authenticated identity or authentication information in order to enable access the one or more services and/or resources associated with the service provider environment according to the plurality of rules and/or policies. It should be noted that in the past, a voice-capturing endpoint may be have been authenticated for any existing resources in the service provider environment by use of a service provider identification (ID). In contrast, using the technology provided herein, commands captured by the voice-capturing endpoint may be authenticated and managed on a per command basis, which may be important if there are multiple, different users each having varying levels of access to a computing environment, such as the service provider environment. Further the access to the computing resources can be managed on a more granular basis which may increase overall security.

In one aspect, the present technology authenticates a device capable of being detected by a voice-capturing endpoint to identify the device as being within a defined geographical or physical location, along with one or more device authentication credentials. The device may be a computer, a laptop, a mobile device, a tablet, a television, a smart phone, or a card, badge, or placard that may include a means for electronic or wireless detection (e.g., a radio frequency identification (RFID) badge or a card having a bar code, and the bar code may be electronic, wireless, and/or optical). Alternatively, the present technology may authenticate a voice-capturing endpoint detected by a device (e.g., a computer, a laptop, a tablet, a smart phone, etc.) to identify the voice-capturing endpoint as being within a defined geographical or physical location, along with one or more device authentication credentials. That is, the voice-capturing endpoint may communicate, broadcast, and/or send a voice-capturing endpoint identification (ID) within one or more defined regions or areas to enable the device to receive, detect, and/or identify the voice-capturing endpoint ID (e.g., using a voice-capturing endpoint). Simply stated, the voice-capturing endpoint may be configured to transmit the identity of the voice-capturing endpoint 140 to surrounding network addressable devices. In one aspect, the voice-capturing endpoint ID may be included with a detected voice of the voice command. The voice-endpoint ID may be an ID of the voice-capturing endpoint ID itself.

In one aspect, the authentication credentials may include a variety of authentication credentials. For example, the authentication credentials may be a login and password, a PIN (personal identification number) entered or spoken into the voice-capturing endpoint or provided on the computing device, a pattern (e.g., a pattern that may be traced on the voice-capturing endpoint or the device, an image provided to the voice-capturing endpoint and/or the device. Additionally, the authentication credentials may include biometric data. Biometric data, such as, for example, voice data, fingerprint data, or retinal data, may be authenticated in order to assist in providing access to the service provider environment.

Authentication credentials of the authenticated device may be combined with authentication credentials of the already authenticated biometric data to establish an authentication identity.

The authentication identity data can be sent from the service provider environment to the device and/or the voice-capturing endpoint. Access to the one or more services and/or resources (e.g., "skills") associated with the service provider environment may be provided to the device by using and/or associating the authenticated identity with each request for the one or more services and/or resources. In addition, the authenticated identity, once generated by the service provider environment, can be sent to the one or more services and/or resources with the voice command, without being sent back to the device from service provider environment (e.g., the voice command can be authenticated and executed in the service provider environment in one call from the voice-capturing endpoint). Furthermore, the device or voice-capturing endpoint may, at least in part, have generated the authentication identity.

In one aspect, the services and/or resources may also be defined according to customer preferences, customer use, and/or a selected combination of services and/or resources to create a customized set of services and/or resources applicable to the customers. For example, the services and/or resources may include functionality for scheduling a conference room, or creating, editing, and/or managing a calendar, such as a corporate calendar. The services and/or resources may include functions, tasks, and/or actions relating to online personal assistance operations, home automation, workplace automation, and audio/visual set up or operations. In short, the services and/or resources may include a variety of actions, tasks, or operations provided by a service provider environment.

In one example configuration, the present technology provides for the authentication of a customer using a combination of authenticated voice data and one or more devices which may be authenticated or recognized. For example, voice data provided by a customer may be identified and associated with the customer. A device that is recognized to be located in proximity to a voice-capturing endpoint or device detection reader may be authenticated and the device authentication may be used with the authenticated voice data. Together, the recognized device and the authenticated voice data may be used in combination to authenticate the customer. Alternatively, the customer may be authenticated by performing one or more actions associated with or on the device. For example, if the device provides token A to the authentication service, the device may request an action from the customer (e.g., requesting a challenge response, provide biometric data, or other customer action request). More specifically, the action may be a request for a PIN, a detectable swipe pattern performed on the device, and/or biometric data. If the customer performs the requested action item correctly on the device, the device may then provide Token A' (token A prime) to the service provider environment. That is, Token A' may indicate the device is authenticated or recognized and the customer's input is authenticated. Token A' may then be used with the authenticated voice data to authenticate the customer. Moreover, each action performed on the device thereafter may also be associated with Token A' and also have one or more rules associated therewith. The authentication service can provide differing levels of service and/or security according to one or more policies or rules that may be associated with the token A' and specific action item.

In one example aspect, the one or more policies or rules may be defined according to one or more policies, procedures, and/or operation protocols relating to the device and/or authentication data of a customer. The one or more policies or rules may include one or more challenge responses which may be provided for receiving additional security access. Also, one or more policies or rules may indicate that if the device is authenticated or recognized and the customer has also been authenticated, then the service may provide the requested services and information. Alternatively, if the device is not authenticated or recognized and the customer has not been authenticated then the service may limit and/or deny the requested services or information or even request additional authentication data for authenticating a customer. The one or more policies or rules may also deny access to an authorized user. In one further aspect, the one or more policies or rules may request additional authentication information or security information from one or more users (which may be known or unknown users) for establishing an authentication identity token. Furthermore, the authenticated identity (e.g. authentication token) may expire or become invalid after a predetermined time period (e.g., one hour). Upon expiration of the predetermined time period, the authenticated identity may use a re-authentication process. The policies or rules may be defined by an administrator, a user, and/or a creator of a compute service.

FIG. 1A illustrates a system 100 for using a multi-factor authentication process to access services in service provider environment 110 according to an example of the present technology. The system 100 may include a service provider environment 110, a client device 130 (e.g., a mobile device, a laptop, a smart phone, a tablet, a computer, a gaming device, a television, a device capable of detecting biometric data, a card, badge and/or placard) that may include a means for electronic, wireless detection, and/or near field communication, and/or a voice-capturing endpoint 140 (e.g., with a voice-capturing endpoint).

In one aspect, the service provider environment 110 may include an authentication service 116 that may authenticate the client device 130, the voice-capturing endpoint 140, and/or biometric data provided by customer 160. That is, the authentication states of the client device 130 and the voice-capturing endpoint 140 can be combined to access the services as limited by the resource policy/rules accessible to the voice-capturing endpoint 140 and/or the client device 130. That is, both authorization states of the client device 130 and the voice-capturing endpoint 140 are valid states (e.g., client device 130 state indicates "authorized" and the state of the voice-capturing endpoint 140 indicates "authorized") and the states are combined together and are associated with the customer's service provider account and/or authenticated biometric data in order to enable access to the service provider environment 110. The service provider environment 110 may then recognize, approve, and authorize and allow the client device 130 and/or the voice-capturing endpoint 140 to issue one or more commands to a service in the service provider environment 110, and/or a service that may be associated with the service provider environment 110.

In one aspect, the client device 130 may be a mobile device, such as, for example, a computer, a tablet computer, and/or a smart phone. In addition, the client device 130 may include a microphone 132 and a speaker 134. The client device 130 may also include a device code, a mobile device model and manufacturer ID, a device serial number (DSN), a MAC (media access control) address, a universal unique device identifier (UUID) and so forth. The device code of the client device 130 may be an alpha-numeric string, a value, a password, an authentication certificate, encryption key, an account related identifier, or another code. The client device 130 may include one or more application programs installed thereon for accessing the service provider environment 110. For example, the client device 130 may prompt a customer 160 to manually or audibly enter login information, such as for example, "please enter authentication information" when prompted by the client device 130, as illustrated on a visual display on the client device 130. The customer 160 may enter, either manually on the client device 130 itself, and/or provide the login information via biometric capturing device on the client device 130. For example, the customer 160 may manually enter into the communication device and/or audibly speak (into the microphone 132) login information, such as, for example "USER1!*" and/or provide biometric data via biometric capture device 124, such a fingerprint and/or retinal scan. The login and/or biometric data can be used by the service provider environment to authenticate the client device 130.

In one aspect, the client device 130 may also detect one or more voice-capturing endpoints 140 and store, display, maintain, and/or audible pronounce (via speaker 134), the voice-capturing endpoint identification. That is, beacon IDs 122 may be visually displayed as the beacon IDs are received from the one or more the voice-capturing endpoint 140 and as the beacon IDs are detected by the communication device.

In one aspect, the voice-capturing endpoint 140 may include be a voice-capturing endpoint. The voice-capturing endpoint 140 may be configured to transmit the identity of the voice-capturing endpoint 140 to surrounding network addressable devices, such as the client device 130. The voice-capturing endpoint 140 may be placed at various locations (e.g., within buildings, vehicles, and outdoor spaces) and when a network addressable device, such as the client device 130, comes within the proximity of a signal (e.g., beacon ID) transmitted by the voice-capturing endpoint 140, the network addressable device, such as the client device 130, may be configured to detect and/or forward the identity (e.g., beacon ID) of the voice-capturing endpoint 140 to the authentication service 116 that identifies and associates the voice-capturing endpoint 140 with a customer 160, and applies the service and resource policy/rules to the voice-capturing endpoint 140 and/or the client device 130. As a result, the functionality of the network addressable device, such as the client device 130, may be determined by the proximity of the client device 130 to the voice-capturing endpoint 140, and determined by the authentication service 116 associated with the voice-capturing endpoint 140 and/or multiple voice-capturing endpoints 140.

In one aspect, the voice-capturing endpoint 140 may be computing hardware and include one or more a wireless speakers 142 and the voice-capturing endpoint 140 may include voice command functionality configured to transmit a voice-capturing endpoint identifier, voice data, and other information to additional network addressable devices, such as client device 130 and/or to the service provider environment 110. For example, a voice-capturing endpoint 140 may transmit a voice-capturing endpoint identifier (e.g., DSN) using a Wi-Fi Internet connection 150. The voice-capturing endpoint 140 may be placed at various locations indoors and/or outdoors, and/or may be made mobile by placing the voice-capturing endpoint 140 on a vehicle and/or a person.

In one configuration, the voice-capturing endpoint 140 may operate in a default mode and continuously listen to incoming speech using one or more microphones 144, while monitoring for a trigger word to be spoken to change the voice-activated-hub to an "awake mode". The voice-capturing endpoint 140 may also provide a voice-activated remote control, which can be used in lieu of the trigger word. The voice-capturing endpoint 140 may also include one or more microphones 144 and may be manually disabled by pressing a mute button to turn off an audio processing circuit. In one aspect, the voice-capturing endpoint 140 may communicate the voice commands of the customer 160 to the client device 130 and/or the service provider environment 110 using the Wi-Fi Internet connection 150 and/or network 120.

In one aspect, the service provider environment 110 may provide virtualized computing services (i.e., virtualized computing, virtualized storage, virtualized networking, etc.) to the authentication service 116, gateway 118 and services and resource policy rules 112. More specifically, the service provider environment 110 may provide virtualized computing, virtualized storage, virtualized networking and other virtualized services that are executing on a hardware substrate. Also, the service provider environment 110 may provide data communication between the authentication service 116 and the services and resource policy rules 112 by way of the network (not shown) that may include a virtual network that is within the service provider environment 110 or other suitable networks, etc.

The authentication service 116 may be included within the service provider environment 110 and/or the authentication service 116 may be remotely located from the service provider environment 110. Also, the services and/or resources policy/rules data store 112 may be included within the service provider environment 110 and/or remotely located from the service provider environment 110. For example, the authentication service 116 and/or the services and/or resources policy/rules data store 112 may be located on a private computing environment.

The service provider environment 110 may provide access to the services and resource policy/rules, and/or a gateway 118, which can be included in the service provider environment 110. In one aspect, the gateway 118 may be a gateway server for accessing the service provider environment 110. In an additional aspect, the gateway 118 may also be a managed service to create, publish, maintain, monitor, and secure application programming interfaces (APIs) to access data, business logic, or functionality from one or more services in the service provider environment 110. In one aspect, the gateway 118 (e.g., an application programming interface "API" gateway) may handle the tasks involved in accepting and processing up to hundreds of thousands of concurrent API calls, including traffic management, authorization and access control, monitoring, and API version management in order to access one or more services and/or resources. In an alternative aspect, the gateway 118 may also be a sending and/or receiving service for sending and/or receiving communication messages between the service provider environment 110 and the client device 130 and/or the voice-capturing endpoint 140.

The services and/or resources policy/rules service 112 may define and/or identify one or more rules and/or policies using the services and/or resources policy/rules for allowing access to one or more services and/or resources associated with a service provider environment 110. The authentication service 116 may authenticate the client device 130 and/or the voice-capturing endpoint 140. The authentication service 116 may establish, create, store, maintain, update, and/or provide an authenticated identity for a customer 160. The authenticated identity may be maintained in the customer's 160 account of the service provider environment. In one aspect, the authenticated client device 130, the authenticated voice-capturing endpoint 140, and authenticated biometric data associated with the customer 160, may be used to create the authenticated identity. The authentication service 116 may send the authenticated identity back to the voice-capturing endpoint 140 and/or the client device 130. The service provider environment 110 may then receive one or more commands from the voice-capturing endpoint 140 or the client device 130 having the authenticated identity to access the one or more services and/or resources associated with the service provider environment 110 according to the plurality of rules and/or policies. In addition, the authenticated identity, once generated by the service provider environment 110 or authentication service 116, may be sent to the one or more services and/or resources with the commands, without being sent back from the service provider environment (e.g., the command can be authenticated and executed in the service provider environment in one call from the voice-capturing endpoint 140).

The authentication process may include one or more authentication levels. For example, the authentication process may first authenticate the device. Second, the authentication process may authenticate a second tier of authentication data, such as for example, a personal identification number (or PIN number), voice data, and/or biometric data. Additionally, the authentication process may include "N" number of authentication tiers, where "N" is a positive integer. For example, the authentication process may authenticate a third tier of authentication data, which may include additional or different data from the first and/or second tier, and/or be unique data such as a different PIN, an alternative voice command request, and/or alternative biometric data. In another example, the second tier authentication process may authenticate a voice command, and the third tier authentication process may authenticate a fingerprint. Alternatively, for example, the second tier authentication process may authenticate a PIN number. The third tier authentication process may also authenticate a voice command and/or a retinal scan. In an additional example, the first tier authentication process may authenticate the voice-capturing endpoint device and/or device using a unique ID of the voice-capturing endpoint device. The second tier authentication process may authenticate biometric data. The third tier authentication process may then authenticate a PIN. In short, each authentication tier may include one or more various authentication processes using one or more authentication credentials.

In addition, one or more of the authentication process tiers may include a challenge response for providing authentication. For example, a challenge response may be issued following the authentication of the voice-capturing endpoint and/or device. The challenge response may indicate to a customer to "please provide the conference ID number". The customer may then provide a voice command with the conference ID number to the computing device and/or the voice-capturing endpoint.

In operation, for example, the authentication service 116 and/or the voice-capturing endpoint 140 may identify and/or detect the client device 130 within a defined geographical location. The authentication service 116 may authenticate the client device 130 and/or the voice-capturing endpoint 140. The client device 130 may be authenticated according to a unique identification (ID), such as a universal unique identifier (UUID). The customer 160 may provide biometric data via the client device 130 and/or the voice-capturing endpoint 140. For example, the customer 160 may issue a voice command stating "Hub, schedule a conference call." The voice data may be received at the voice-capturing endpoint and may be sent or relayed to the authentication service 116. The authentication service 116 may authenticate the voiced data received from the voice-capturing endpoint 140 according to the authenticated identity of the customer 160. In one aspect, the authentication service 116 can authenticate the voice data by comparing the current voice data of the customer with voice data that is stored in the authentication service 116. Alternatively, the voice-capturing endpoint 140 may provide one or more challenges to the customer 160, such as for example "say red, white, and blue). The customer 160 may provide one or more responses to the voice-capturing endpoint 140 (such as "red, white, blue). Thus, the authentication service 116 may compare the voice data provided to the voice-capturing endpoint 140 and determine whether the voice data corresponds and/or relates to the one or more challenges provided through the voice-capturing endpoint.

Thus, as described above in FIG. 1A, the present technology provides a solution for customers to use a multi-factor authentication process to access a computing service environment. To further describe the present technology, the customers 160 may login to an account of the service provider environment 110, such as a customer account. Alternatively, the customer 160 may provide one or more authentication credentials to access the service provider environment 110, particularly when the customer 110 does not have a customer account with the service provider environment 110. For example, a customer may be an employee of a corporation and may be joining a conference call using the voice-capturing endpoint 140 previously authenticated by the service provider environment 110 and associated with an authenticated identity of the customer 160, which may be the creator of the conference call. Alternatively, the customer may be a new or temporary user, new employee, and/or a "limited access" employee and may be joining a conference call using the voice-capturing endpoint 140. The voice-capturing endpoint 140 may allow the employee-customer to state "Hub, please join me to the conference call". The phrase stating "Hub, please join me to the conference call" may be the authentication credentials. Thus, when the employee-customer issues the voice data containing the phrase "Hub, please join me to the conference call" the employee-customer may be temporarily granted authorization to the voice-capturing endpoint 140. Also, the service provider environment 110 using the authentication service 116 may also create a temporary customer account and/or an authorized identity, using the one or more embodiments described herein, to enable the temporary employee-customer to access the one or more services and/or resources as described herein.

Next, the service provider environment 110 may associate the voice-capturing endpoint's 140 device serial number (DSN) with the customer's 160 account or the temporary account of a temporary customer. For example, the customer 160 may be associated with one or more the voice-capturing endpoints 140 with each DSNs being associated with a customer account (specifically the authorized identity) of the customer 140. For example, the customer 160 may purchase one or more voice-capturing endpoint 140 and the DSNs from each order may be tied to and/or associated to the customer's 160 account and/or the customer 160 may be able to manually enter or electronically detect or provide, such serial numbers via an API, or the serial numbers from devices acquired elsewhere.

Also, each voice-capturing endpoint 140 may be configured according to the customer 160 preferences. In one aspect, the voice-capturing endpoint 140 may be configured via Wi-Fi network information. Further, the service provider environment 110 may be associated with an application, which may be installed on the customer's client device 130, and the application may be associated with one or more accounts of the customer 160 and may search for Wi-Fi access points being broadcast by voice-capturing endpoints 140 that may be in set up mode and/or active use mode. The application, such as an application installed on the client device 130 may match the DSNs of the voice-capturing endpoints 140 with registered DSNs from the customer's 160 account and automatically configure the voice-capturing endpoint 140 according to the services and resource policy/rules for accessing the services and/or resources.

In one aspect, a customer 160, which may be an administrator, may configure access to services and/or resources that are internal to and/or external to the service provider environment 110, such as, for example, configuring directory, conferencing, calendaring, communication, and mail services. Once connected to the service provider environment 110 via the voice-capturing endpoint 140, the customer 160 may be able to assign specific voice-capturing endpoints, such as voice-capturing endpoint 140, to one or more customer's offices and/or conference rooms. These services and/or resources interactions with the voice-capturing endpoints, may be controlled, in part, based on the context of where a particular voice-capturing endpoint, such as voice-capturing endpoint 140, is located and who is identified as an owner of the voice-capturing endpoint 140, or identified as permanent or temporary customer of the voice-capturing endpoint 140.

In another configuration, other individuals, such as employees of a customer, may be able to associate their work credentials with the customer account for being able to access and/or use the voice-capturing endpoint 140, for example by downloading and/or using an application associated with the voice-capturing endpoint 140. This will allow one or more customers to access work calendars via the voice-capturing endpoint 140, as well as other personal information (e.g., music playlists associated with the customer's account) from the voice-capturing endpoint device, which may be located in their office, conference room, and/or vehicle. This capability may be controllable by an administrator customer, such as customer 160, identified via policy and/or rule configurations.

In an additional aspect, a customer, such as customer 160, may be an administrator and view: deployed voice-capturing endpoint devices, versions of programming applications used by the voice-capturing endpoint devices, and rules and/or policies governing the services and/or resources accessible to and/or performed by the voice-capturing endpoint devices. In one aspect, the customer 160 (e.g., an administrator) may be able to manage Wi-Fi configurations for each voice-capturing endpoint 140, and remotely configure rules and/or policies for any voice-capturing endpoint device that may be deployed in the organization of the administrator.

In an example configuration, a customer, such as customer 160, may define and/or set up the rules and/or policies that control what services and/or resources are available to other customers, such as employees within the organizations, and what authentication is needed to access or perform the various services and/or resources using the voice-capturing endpoint 140. Thus, in order to access the services and/or resources, each customer must be authenticated, as described herein, thereby creating an "authentication session" for communicating to the voice-capturing endpoint 140 for accessing and/or performing the one or more services and/or resources.

In one aspect, a customer 160, which may be the administrator, may also determine how long the authenticated session, for using the voice-capturing endpoint 140 to access and/or perform one or more services, may last. In one aspect, the client device 130 of the customer 160 (which may be an end user) may be used to provide a "hint" or alert to conclude and/or end an authenticated session. Also, the client device 130 may also provide a warning notification that the authenticated session is ending upon the communication device moving outside a selected physical distance and/or moving away from the voice-capturing endpoint 140. Thus, the client device 130 may also use a re-authentication procedure upon termination of the authenticated session to connect to an additional session. Also, a re-authentication procedure may be used for one or more additional commands, which may be associated with either the authenticated session and/or the re-authenticated session. In one aspect, each command may be authenticated and managed on a per command basis.

Figure 1B:
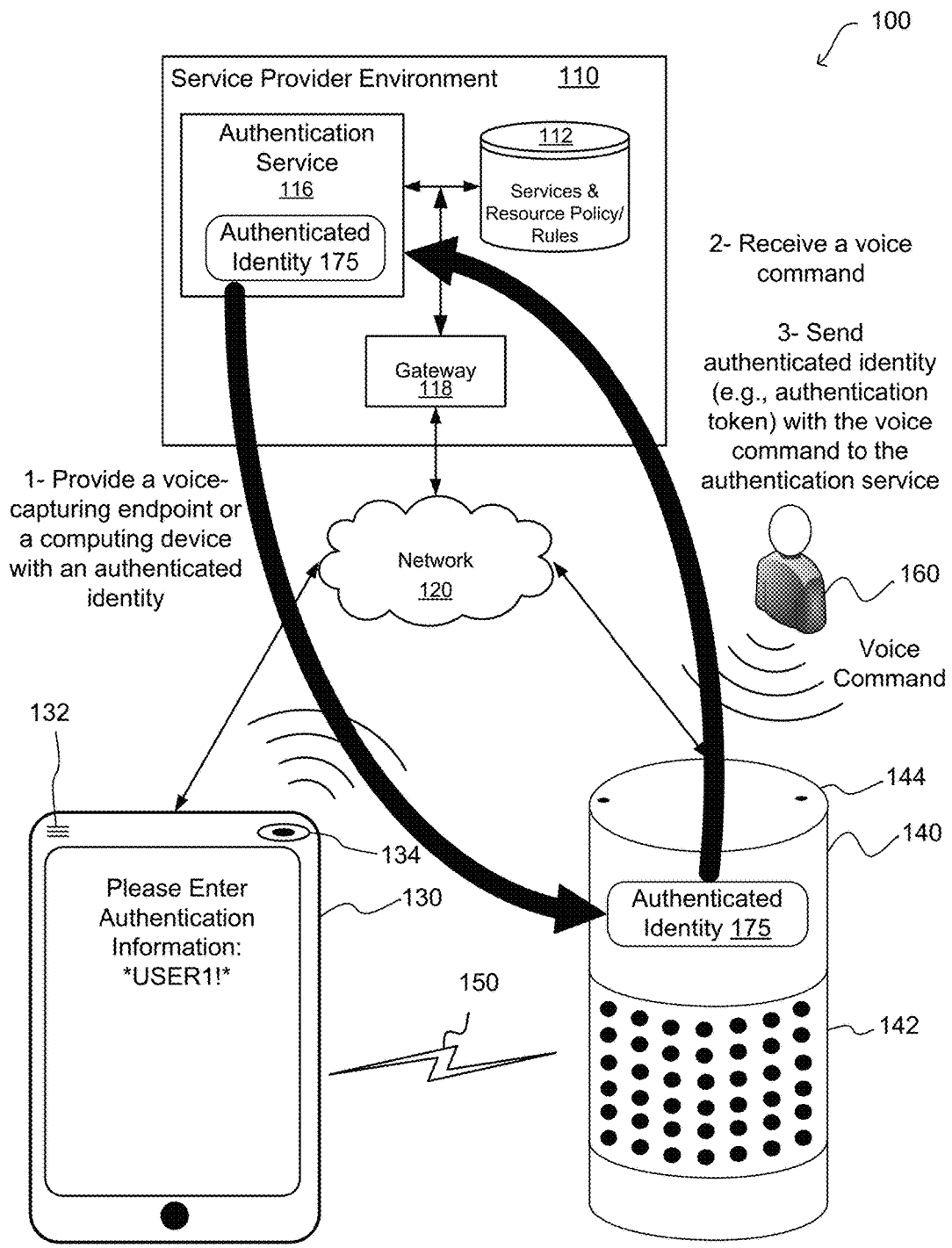
FIG. 1B illustrates the system of FIG. 1A using an authenticated identity according to an example of the present technology.

FIG. 1B illustrates the system 100 of FIG. 1A using an authenticated identity (e.g., an authentication token) according to an example of the present technology. In one aspect, the authentication service 116 may establish the authenticated identity for the customer 160. The authenticated identity may be represented using an authenticated identity 175 that may be provided to the voice-capturing endpoint 175 upon the authentication of the client device 130 and voice data received from the voice-capturing endpoint 140. In this way, the authenticated identity 175 may be used with each voice command to provide further security, authentication, and/or authorization. In operation, the system 100 may 1) provide the authenticated identity 175 to the client device 130 and/or the voice-capturing endpoint 175. Alternatively, the authenticated identity 175 may be sent to the service or resource that will handle the command without being sent back to the voice-capturing endpoint 175. The service or resource can then use the authenticated identity 175 consistent with the policy. 2) One or more voice commands may be issued by the customer 160 to the voice-capturing endpoint 175. The voice-capturing endpoint 175 may send or forward each received voice command with the authenticated identity 175 to the authentication service 116. In this way, each voice command is provided with the authenticated identity 175 to request, execute, and/or perform each command associated with the voice command having the authenticated identity 175. Voice commands having the authenticated identity 175 may processed at the service provider environment while other voice commands may be rejected.

In an alternative embodiment, one or more additional workflows may employed. For example, (1) a user, and/or a device associated with a user, may determined and identified to be within proximity to an alternative device, such as the voice-capturing endpoint, and may be prompted to provide a user identification (ID) (e.g., a fingerprint, a swipe, a pin, a retinal scan, other biometric data, and/or a combination thereof). (2) The user may voice a command. (3) The command, the user ID, a user-associated device ID (e.g., an ID of a device associated with the user), and/or alternative device ID (e.g., the voice capturing endpoint ID) may be grouped together. (4) The total group ID information may be sent to an authentication service. (5) The authentication service may authenticate the total group ID information and/or alter, adjust, and/or change the group ID information, such as by creating an authentication token for the changed group ID information, based on authenticating the group ID information. The authentication service may send the information, such as the authentication token, to a service and/or computing resource that is desired to be used or accessed, particularly in the event the command from the voice capturing endpoint goes directly to the service and/or computing resource. In addition, after receiving the authentication token, in some embodiments the service and/or computing resource may respond back to the authentication service to verify the token, which may then cause the authentication service to respond back to the service and/or computing resource verifying the token so that the command can be executed. The authentication service may also change the command to different command to reflect the authenticated information (in which case the authentication service can forward the entire command to the service or computing resource). In this way, additional API calls may be eliminated from the voice-capturing endpoint.

In an additional aspect, the authenticated identity (ID) may be established before the command, but the authenticated identity may not be sent to the device. Rather, the authenticated identity may be sent to the service directly with information on the time duration of how long the authenticated identity will be active and/or remain available for use. Thus, the command may be associated with the authenticated identity at the service, service provider environment or a central computing location.

Figure 2:
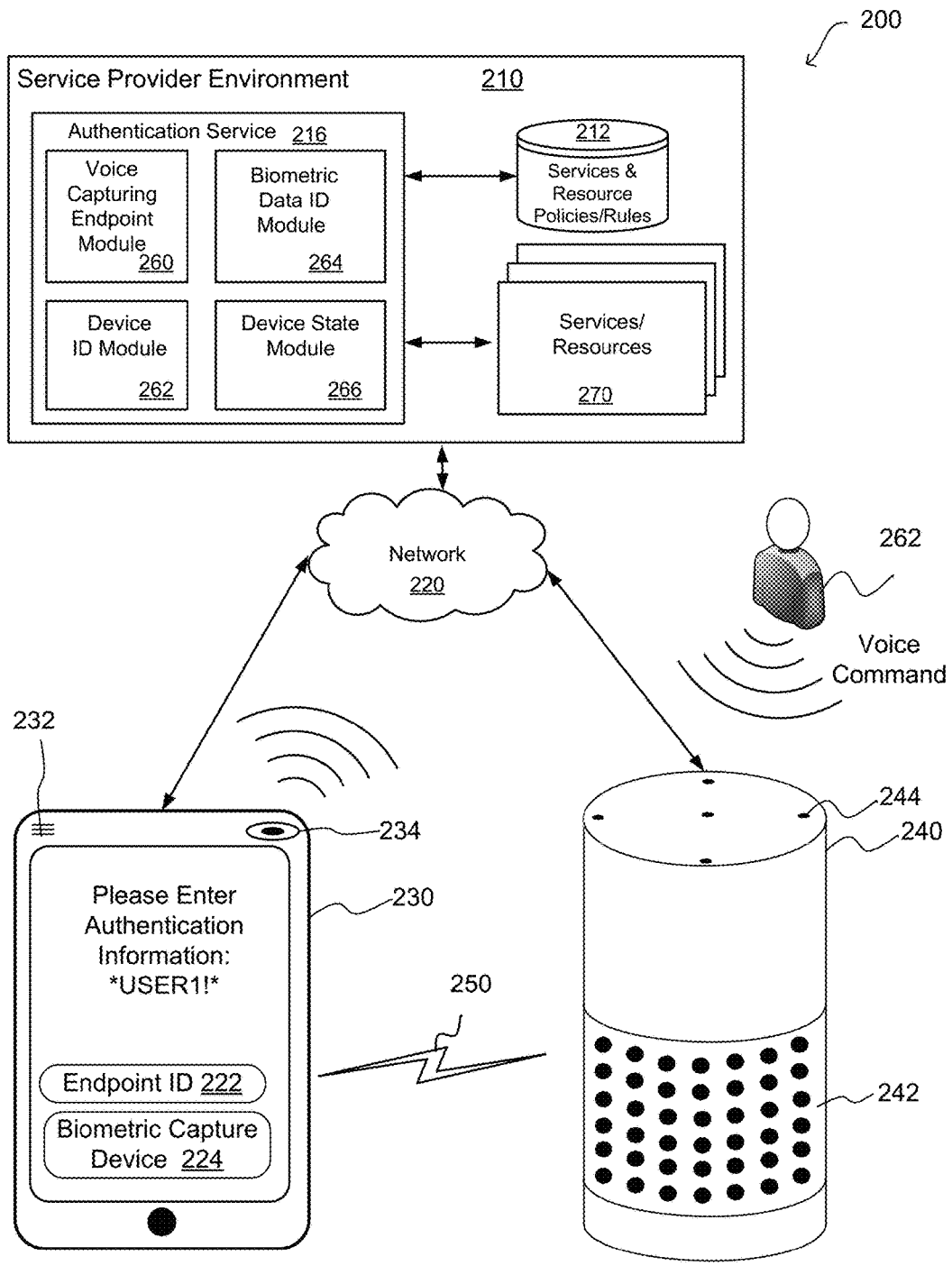
FIG. 2 illustrates an additional system for using a multi-factor authentication process using services and resource policy rules to access services in a service provider environment according to an example of the present technology.

FIG. 2 illustrates a system 200 for using a multi-factor authentication process to access services in a service provider environment 210. In one aspect, each of the components, modules, functions, embodiments, operations, and/or services described in FIG. 1 may also apply to the components, modules, and services of FIG. 2. Also, one or more of the operations and actions of FIG. 1 may also be included in one or more operations or actions of FIG. 2.

Similar to FIG. 1, the system 200 may include a service provider environment 210, a communication device 230 (e.g., a mobile device with speaker 234), network 220, and/or a voice-capturing endpoint 240 (e.g., including a voice-capturing endpoint) that may include one or more microphones 244 and one or more speakers 242. The service provider environment 210 may include an authentication service 216, a services and resource policies/rules data store 212 to store rules and/or policies for allowing access to services of the service provider environment 210, and a services and/or resources 270 that may be used to call and/or command one or more services or resources when upon receiving one or more commands in the service provider environment 210, as allowed by the services and resource policies/rules data store 212. These services or resources may be performed and/or used upon receiving one or more voice commands from the voice-capturing endpoint 240. In one aspect, the authentication service may include a voice-capturing endpoint module 260, a biometric data ID module 264, a device ID module 262 (or a communication device ID module), and/or a device state module 266. In one aspect, the services and/or resources 270 are the one or more various types of services and/or resources that may accessed. In one aspect, the one or more services and/or resources (e.g., "skills") may include, for example, but not limited to, scheduling conference calls, identifying a speaker during a conference call, a scheduling assistant, calendaring services, access calendars, phone directories, e-mail, creating, scheduling, and/or modifying tasks, and so forth.

In one aspect, the authentication service 216 can define and/or identify a plurality of rules and/or policies stored in the services and resource policies/rules data store 212 for providing access, to the services and/or resources 270, and/or to the one or more services and/or resources that may be externally associated with the service provider environment 210. In one aspect, the communication device 230 may detect one or more voice-capturing endpoints 240 within a defined physical/geographical location, and receive, identify, store, and/or display the voice-capturing endpoint identification (e.g., hub ID 122). The authentication service 216 may then receive login information from the communication device 230. The device ID module 262 may receive, send, provide, store, maintain, update, and/or manage the identification of the communication device 230. The authentication service 216, using the information provided by the device ID module 262, may authenticate the communication device 230, which was previously and/or concurrently identified as being in proximity to the voice-capturing endpoint 240 according to one or more mobile device authentication credentials. For example, the authentication service 216 may validate and authorize the communication device 230 using a unique ID of the communication device 230 and/or stored login credentials, which may include the unique ID. Alternatively, if the communication device 230 has not previously been registered within the service provider environment 210, the communication device 230 may provide the communication device 230 unique ID and/or the hub ID 222 in order to gain temporary and/or permanent access to the service provider environment 210.

The authentication service 216 may authenticate biometric data using the biometric data identification (ID) module 264, such as voice data, fingerprint data, retinal data, received from the microphone 232 and/or biometric capture device 224, in order to access the service provider environment 210.

In one aspect, the states of the devices can be stored, maintained, and/or updated by the device state module 266. Thus, the authentication service 216, using the device state module, may synchronize authentication credentials and/or authentication states of the authenticated communication device 230 with authentication credentials and/or authentication states of the authenticated biometric data to establish an authenticated identity. That is, the authentication states of the communication device 230 and the voice-capturing endpoint 240 may be synchronized to access the service and resource policies/rules data store 212. This may mean that both authorization states (e.g., client device 130 state indicates "authorized" and the state of the voice-capturing endpoint 140 indicates "authorized) are now valid and in operation and the states are synchronized together in order to establish an authenticated identity and enable the service provider environment 210 to recognize, approve, authorize, and allow the communication device 230 and/or the voice-capturing endpoint 240 to issue one or more commands to a service in the service provider environment 210, and/or a service that may be associated with the service provider environment 210.

In one aspect, the authentication identity may be stored and managed by the authentication service 216. The authenticated identity may be sent to the communication device 230 and/or to the voice-capturing endpoint 240 to provide permissions to access one or more services in the service provider environment 210. The service provider environment 210 may delegate authority to the communication device 230 and/or to the voice-capturing endpoint 240 to access the one or more services and/or resources 270 associated with the service provider environment 210 by using the authentication identity. The authentication identity may enable the communication device 230 and/or to the voice-capturing endpoint 240 to issue one or more voice commands to request a service or resource. The one or more voice commands may be constrained to include the authenticated identity in order to access the one or more services and/or resources. The service provider environment 210 may receive a voice command, via the voice-capturing endpoint 240, along with the authenticated identity to access the one or more services and/or resources associated within the service provider environment according to the plurality of rules and/or policies. The service provider environment 210 may then execute a command based on the voice command, which includes the authenticated identity for the one or more services and/or resources.

For example, the technology as described herein may create the authenticated identity (ID) or information using the authentication service. For example, the authenticated identity (ID) or information may be created by hashing a device ID, biometric data, voice endpoint ID, and/or a combination thereof to create a token, certificate, and/or authentication credentials. Then, an application programming interface (API) call that may include the voice command may also include the newly created token, certificate, and/or authentication credentials. That is, the API call with the voice command and the token, certificate, and/or authentication credentials may be referred to as a service command. The voice command may also be a .wav file, or any other format suitable for representing the voice command. The service command may be sent to a service associated with the voice-capturing endpoint and the service can connect with any other services that are required, such as, for example, calendaring, messaging, etc. In addition, when a service receives the service command, the service can call the authentication service to make sure the token is valid and launch execution of the command.

In operation, the authentication process may also include performing one or more of the following. In one aspect, a push notification may be triggered by the service provider environment 210 to an end-user's authenticated mobile device, such as, for example, communication device 230 associated with customer 261. The customer 261 may respond to the push notification in order to gain access to the request. In another configuration, the authentication operation may be multi-factor authentication operation requiring the customer 261 to authorize the voice-capturing endpoint 240. For example, the multi-factor authentication operation may include authorizing the communication device 230 and the voice-capturing endpoint 240 with a customer's account. For example, the service provider environment may associate, identify, and/or determine the DSN of the voice-capturing endpoint 240, which may be associated with the customer's 262 account in the service provider environment 210. The multi-factor authentication operation may include authenticating the communication device 230 by associating, identifying, and/or determining the unique ID of the communication device 230, which may be associated with the customer's 262 account in the service provider environment 210. The multi-factor authentication operation may include authenticating biometric data, such as, for example, voice data, fingerprint data, retinal data, by associating, identifying, and/or determining the biometric data that is associated with the customer's 262 account in the service provider environment 210. In this way, the voice-capturing endpoint 240 and the application, which may be installed on the communication device 230 for accessing the service provider environment 210 may be used as described herein to eliminate complex computing systems and additional hardware for using a multi-factor authentication process to access a computing service environment.

In one aspect, the use of a voice-capturing endpoint 240 may be combined with the use of an end user's phone, such as, for example, the communication device 230 of customer 261, to identify the customer's 262 presence in proximity to the voice-capturing endpoint 240. For example, when a customer 261 is inside an organization with the user's mobile phone and approaches within a defined radius of the voice-capturing endpoint 240 that may be registered to and/or authorized for the customer 261, the customer 261 may issue one or more voice commands that use authentication, prior to servicing the voice command.

In one aspect, the customer may be identified via biometric data, such as voice data. The voice data of customer 261 that is detected by the voice-capturing endpoint 240 may be identified. That may enable the service provider environment to identify who is speaking to the voice-capturing endpoint 240. In this way, by identifying who is speaking to the voice-capturing endpoint 240, increased security is provided for cases where the voice-capturing endpoint 240 may be assigned to a customer (e.g., customer 261) and the voice-capturing endpoint may authorize or detect that the voice that the voice-capturing endpoint 240 captures belongs to that particular customer 261, such as, for example, by identifying the voice data as matching an authenticated identity of the customer, as compared to determining who the speaker is out of a collection of a variety of customer possibilities.

Thus, as described herein, the voice-capturing endpoint 240 may be configured to increase the efficiency and simplicity of securely performing or accessing one or more services and/or resources. For example, the services and/or resources may be a services and/or resources that may be performed frequently (e.g. sending an email to coworkers), or services and/or resources that may be performed less frequently (e.g. ordering an airline tickets for an employee). The services and/or resources may provide common variations of a task or use some small interaction on an application of the communication device 230 in order to handle out-of-bounds cases. For example, the order airline tickets service may guide the customer 230 through a set up process using a mobile application that may be installed on the communication device 230 to provide initial account information and configure their "Order Airline ticket" information. Thus, a voice command spoken to the voice-capturing endpoint 240 may state "Hub, open airlines and order two tickets flying out on Aug. 23, 2016 for Steve and Bob".

Figure 3:
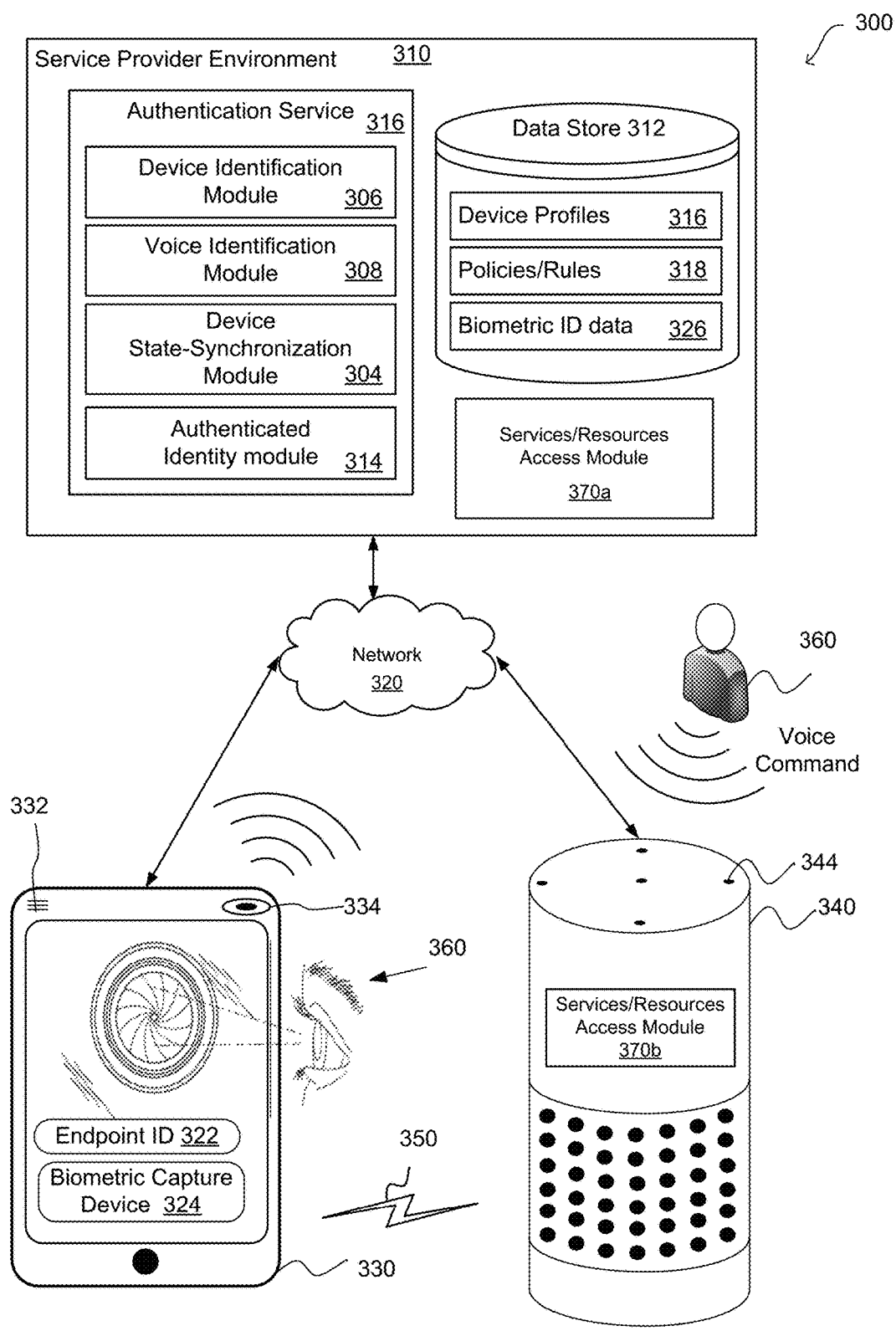
FIG. 3 illustrates an additional system for using a multi-factor authentication process to access services using a data store in a service provider environment according to an example of the present technology.

Turning now to FIG. 3, a system 300 is depicted for accessing services in a service provider environment 303. In one aspect, each of the components, modules, and/or services described in FIGS. 1-3 may also apply to the components, modules, and services of FIG. 3.

Similar to FIGS. 1-2, the system 300 may include a service provider environment 310, a communication device 330 (e.g., a mobile device with microphone 334 and speaker 332), and/or a voice-capturing endpoint 340 (e.g., with a voice-capturing endpoint). The service provider environment 310 may include an authentication service 316, a data store 312, and/or a services and/or resources 370a. In one aspect, the voice-capturing endpoint 340 may also include the services and/or resources 370b (which may be collectively and/or individually referred to herein as "370").

The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store 312 may include storage systems such as a SAN (Storage Area Network), cloud storage network, volatile or non-volatile RAM, optical media, or hard-drive type media. The data stored in the data store 312, for example, may be associated with the operation of the various applications and/or functional entities described below.

In one aspect, the authentication service 316 may include a device identification module 306, a voice identification module 308, a device state-synchronization module 304, and/or an authenticated identity module 314. The data store 312 may store, maintain, and update device profiles 316 as identified by the device identification module 306. The data store 312 may store, maintain, and update policies/rules 318 that define one or more parameters for accessing one or more services and/or resources internal to and/or external to the service provider environment 310. The data store 312 may store, maintain, and update biometric identification (ID) data 326, such as, for example, voice data, fingerprint data, and/or retinal data.

In one aspect, the services and/or resources 370a, 370b may perform one or more various types of services and/or resources. The one or more services and/or resources (e.g., "skills") may include services that are, for example, but are not limited to, scheduling conference calls, identifying a speaker during a conference call, a scheduling assistant, calendaring services, accessing, editing, and/or updating calendars and/or phone directories, generating and/or sending e-mails, creating, scheduling, and/or modifying tasks or actions, and so forth. The one or more services and/or resources (e.g., "skills") may include one or more services, tasks, actions that may be predefined for the services/resources access module 370a, 370b to access and/or perform. Also, the one or more services and/or resources (e.g., "skills") may include one or more resources for the services and/or resources 370 to access to execute the one or more predefined services, tasks, and/or operations. In one aspect, the communication device 330 is associated with customer 360.

In operation, the voice-capturing endpoint 340 may communicate with the communication device 330 using a Wi-Fi Internet connection 350 or another wireless connection. The communication device 330 may communicate with the service provider environment 310 via the network 320 to send a unique identifier, such as a UUID, and/or a voice-capturing endpoint identification (ID) 322, which was received from the voice-capturing endpoint 340. That is, the communication device 330 may login into the service provider environment 310, for the customer 360, using various login credentials, which can include the unique ID of the communication device and/or the voice-capturing endpoint ID received from the voice-capturing endpoint 340. The service provider environment 310 can identify, using the device identification module 306 and the device profiles 316, the type of communication device 330 that is associated with the voice-capturing endpoint 340 and the customer 360. The customer 360 may provide voice commands to the voice-capturing endpoint and/or provide other biometric data to the biometric capturing device 324, which may be stored and retrieved at later times as the biometric ID data 326 for authenticating the communication device 330 and/or the voice-capturing endpoint 340.

In one aspect, the service provider environment 310 may access the data store to identify a plurality of rules and/or policies in the policy rules data store 318 for providing access to the one or more services and/or resources, using the services/resources access module 370a, 370b associated with the service provider environment 310.

The device identification module 306 may authenticate the communication device 330, which has been detected to be located within a defined proximity of or in geographical location of the voice-capturing endpoint 340 according to one or more mobile device authentication credentials. For example, the authentication credentials may be a unique ID, challenge responses provided by the customer 360, and/or historical data, such as data stored relating to the device profiles 316. The device identification module 306 may authenticate biometric data, which may be provided to the voice-capturing endpoint 340 by way of voice data, and/or provided to the biometric capture device 324 of the communication device 330 in order to access the service provider environment. The device state-synchronization module 304 may synchronize authentication states of the authenticated communication device 330 with the authenticated biometric data to establish an authenticated identity using the authenticated identity module 314. The authenticated identity module 314 may then delegate authority to the communication device 330 and/or the voice-capturing endpoint 340, using the authenticated identity, for accessing the one or more services and/or resources associated with the service provider environment 310. In one aspect, having established the authenticated identity for the customer 360 (e.g., the customer 360 is logged into the service provider environment 310 using the appropriate and authenticated communication device 330 and the appropriate and authenticated voice-capturing endpoint 340) the authenticated identity module 314 may receive one or more voice commands that include the authenticated ID via the voice-capturing endpoint 340. The services/resources access module 370a and/or 370b may send a command that includes the authenticated identity to access and/or perform the one or more services and/or resources associated with the service provider environment according to the plurality of rules and/or policies.

The voice-capturing endpoint 340 may also include the services/resources module 370b to execute one or more services and/or resources 370 via the network 320. Accordingly, the voice-capturing endpoint 340 may, singularly and/or in combination with the service provider environment 310, access one or more services and/or resources and/or perform one or more services according to the policies/rules 318 data.

By way of example, the system 300 may be employed within a conference room, such as in a business conference room. In one aspect, the voice-capturing endpoint 340 can provide dual uses in a conference room. The voice-capturing endpoint 340 can include one or more computing applications and/or hardware to interface with and/or communicate with the service provider environment 310. In one aspect, the voice-capturing endpoint 340 can be used as an interface to the service provider environment 310. In another aspect, the voice-capturing endpoint 340 can also be used as high-quality, omni-directional microphone for conference calls, such as via the use of Wi-Fi and an internet connection. In this manner, the voice-capturing endpoint 340 may eliminate the burden and troubles of connection cables while also providing the capability of being transported and/or moved from one physical location to another physical location as needed.

In an additional aspect, the system 300 may be employed to identify a person speaking into the system 300 (e.g., "speaker identification"). In one aspect, the system 300 may be used to identify the customer 360 during a conference call. For example, using the technology described herein, the system 300 can identify the customer 360 speaking when one or more persons connect from each customer's own device (laptop, tablet, phone, RFID tag or near field communication tag), or in a conference room where participants are grouped together. For example, by establishing the authenticated identity, which may include the identification for each customer of an authorized communication device and/or an authorized voice-capturing endpoint 340, for each customer (e.g., customer 360) of the service provider environment 310, the communication device 330, and/or the voice-capturing endpoint 340 (each having the authorized identity) may identify which customer has issued a voice command, such as to the voice-capturing, endpoint 340. Furthermore, if the service provider environment 310, the communication device 330, and/or the voice-capturing endpoint 340 are made aware as to who may be the attendees of the meeting, the service provider environment 310, the communication device 330, and/or the voice-capturing endpoint 340, singularly and/or in combination, may eliminate those users who have signed into the service provider environment and are talking via their own communication device and/or to the voice-capturing endpoint 340. That is, the service provider environment 310, the communication device 330, and/or the voice-capturing endpoint 340, using the authorized identity may identify the authorized customers that may communicate voice commands to the voice-capturing endpoint 340. For example, as one or more customers in a conference room go around the room identifying themselves, such as by issuing voice commands such as "this is John", "this is Sally," "this is Bob", the voice-capturing endpoint 340 may use its directional microphone to tie the voice with the person. More specifically, the voice-capturing endpoint 340 may receive the authenticated identity from the service provider environment 310 and use the authenticated identity to identify and recognize the customer 306 according to the authenticated identity (e.g., a voice print authenticated by the service provider environment 310).

In an additional aspect, the system 300 may be employed as an audiovisual (AV) coordinator. For example, in one aspect, for an AV meeting, the voice-capturing endpoint 340 may be configured with functionality for accessing and/or performing one or more services/resources in order to increase efficiency of setting up and performing an AV meeting, such as, for example, by eliminating a set up process for the A/V meetings. Instead of requiring complicated A/V control systems, in one aspect, the voice-capturing endpoint 340 may provide services and/or resources upon receiving a voice command from the customer 360. For example, the customer may issue one or more voice commands to the voice-capturing endpoint 340 (herein named "Hub" for illustration purposes only) stating "Hub, display computer meeting" and "Hub, video conference with Jonathan in Palo Alto," and/or "Hub, dim the lights." In one aspect, the voice-capturing endpoint 340 may be configured to send/relay each voice command to the service provider environment 310 and each requested service or resource may be performed. In this way, the voice-capturing endpoint 340 increases the efficiency of setting up AV meetings while performing one or more services, tasks, and/or operations according to the voice command of the customer 306. Specifically, the voice-capturing endpoint 340 may forward each voice command (having the authenticated identity) to the service provider environment 310. In turn, the service provider environment 310, and/or the voice-capturing endpoint 340 itself, may issue a command, which may also include the authenticated identity, to the computer display to "display the computer meeting" and/or display any information related to the AV meeting, such as displaying on the computer each AV meeting member and a corresponding physical location of the AV meeting member. Also, the service provider environment 310, and/or the voice-capturing endpoint 340 itself, may issue a command, which may also include the authenticated identity, to videoconference with Jonathan in Palo Alto. The service provider environment 310, and/or the voice-capturing endpoint 340 itself, may issue a command, which may also include the authenticated identity, to one or more lighting resources to "dim the lights."

In an additional aspect, the system 300 may be employed as a meeting assistant. For example, the voice-capturing endpoint 340 itself can be used as a conference microphone (e.g., using microphone 344). In an additional aspect, the voice-capturing endpoint 340 can be turned on and function as a meeting assistant. For example, the voice-capturing endpoint 340 itself can record a meeting and identify each speaker, according to the authenticated identity of each speaker, to annotate transcripts. In an additional aspect, the voice-capturing endpoint 340 itself can use voice recognition to assist with speech-to-text creation, which can also be used to aid in searching meeting minutes.

Moreover, the voice-capturing endpoint 340 may access and be in communication with one or more computing systems, which may be internal or external to the service provider environment 310, that are used to take minutes and/or action items. For example, in one aspect, a voice command sent from the customer 360 to the voice-capturing endpoint 340 can state "Hub, set up meeting with these participants for next week," "Hub, tell Jonathan to send Bill updated metrics," "Hub, please ask Jimmy to join this meeting," or "Hub, please send my document title 'Hub@Work Memo' from my file 'WorkDocs' to all meeting participants". Thus, the voice-capturing endpoint 340 can 1) set up a meeting with the indicated participants for next week, 2) indicate to Jonathan to send Bill updated metrics, such a via a communication message (e.g., an email from the voice-capturing endpoint 340 to Jonathan), 3) send an request to Jimmy to join the meeting, such as, for example, via an email and/or calendar request, and/or 4) send the document title 'Hub@Work Memo' from the file 'Work-Docs' to all meeting participants." In this way, the voice-capturing endpoint 340 can improve the efficiencies of meetings as well as assist with follow-up actions, tasks, and/or calendaring events.

In an additional aspect, the system 300 may be employed as a conference room assistant. In one aspect, the voice-capturing endpoint 340 may be located in one or more geographical locations and may also be associated with one or more calendars relating to the one or more geographical locations to serve as a conference room assistant. For example, the customer 360 may enter into a physical location housing the voice-capturing endpoint 340, such as a conference room in a building, and issue a voice command to the voice-capturing endpoint 340 stating "Hub, is this room available now". The voice-capturing endpoint 340, using the one or more embodiments described herein, may be associated with the particular conference meeting room calendar and the voice-capturing endpoint 340 can reply back to the customer a response verbal command, such as, for example, "Yes, you can have it for the next 17 minutes," and/or "Yes, but only for the next 5 minutes, however there are 3 other conference rooms nearby that I can reserve for you." Thus, the voice-capturing endpoint 340 can function as a conference room assistant and 1) identify both the availability of one or more physical locations associated with the voice-capturing endpoint 340 and 2) reserve, schedule, cancel, update and/or perform any other task, action, and/or operation associated with calendaring activities for the one or more physical locations associated with the voice-capturing endpoint 340.

In an additional aspect, the system 300 may be employed as an office personal assistant (OPA). For example, the voice-capturing endpoint 340 can execute one or more tasks, actions, and/or operations associated with office personal assistance operations in either the home and/or the workplace. The customer 360 that is speaking to the voice-capturing endpoint 340 can be identified and can be granted access to calendars and other sensitive content that may need to be protected.

In an additional aspect, the system 300 may be employed for identifying one or more customers 360, such as an employee. For example, a customer 360, such as a work employee, may be required to wear an ID device, such as a badge or have a device on or about the employees person, purse, bag, pocket, backpack, or other device, that may include near-field sensors (or sensors used in automobile key fobs that may have a limited range) built into the employees ID device. Thus, the voice-capturing endpoint 340 may include one or more sensors (not shown) that can detect the ID device and associate the ID device with an authorized identity to determine which employee located within a defined physical location at or near the voice-capturing endpoint 340. The authentication of the ID device for a person can be combined with speaker identification as an additional layer of security. Once the customer 360 (e.g., speaker) is identified, access can be given to allow the voice-capturing endpoint 340 to access one or more defined services and/or resources using the services/resources access module 316b. For example, the voice-capturing endpoint 340 may be allowed to access employee or business calendars, phone directories, e-mail, and/or other systems. The voice-capturing endpoint 340 can be used to ask and answer questions with references to corporate Wilds, meetings schedules and reminder, calls started, reminders given or provide, and/or other type of actions or tasks associated with business meetings all within a secure corporate environment that may be associated with the voice-capturing endpoint 340 and/or the service provider environment 310.

To further illustrate the present technology, consider the following example using the technology of FIGS. 1-3. In one aspect, one or more employees may have an authorized identity and/or may create a temporary authorized identity, as described herein, and may be assigned one or more pre-approved items or services for ordering and/or be assigned a list of pre-approved sellers than can fulfill the orders of the pre-approved items. The approved items and/or approved vendors may be associated with the customer's account and/or authorized identity. When a customer's employee wants to order an approved item, for example, the employee may order the item via the voice-capturing endpoint. Thus, when an authorized customer provides to the voice-capturing endpoint one or more requests, such as, for example, "Hub, re-order coffee," "Hub, order blue pens," "Hub, order 3 250 ml beakers," and each request may include the authorized identity and perform each service, such as re-ordering coffee, ordering blue pens, and/or ordering 3 250 ml beakers.

Figure 4:
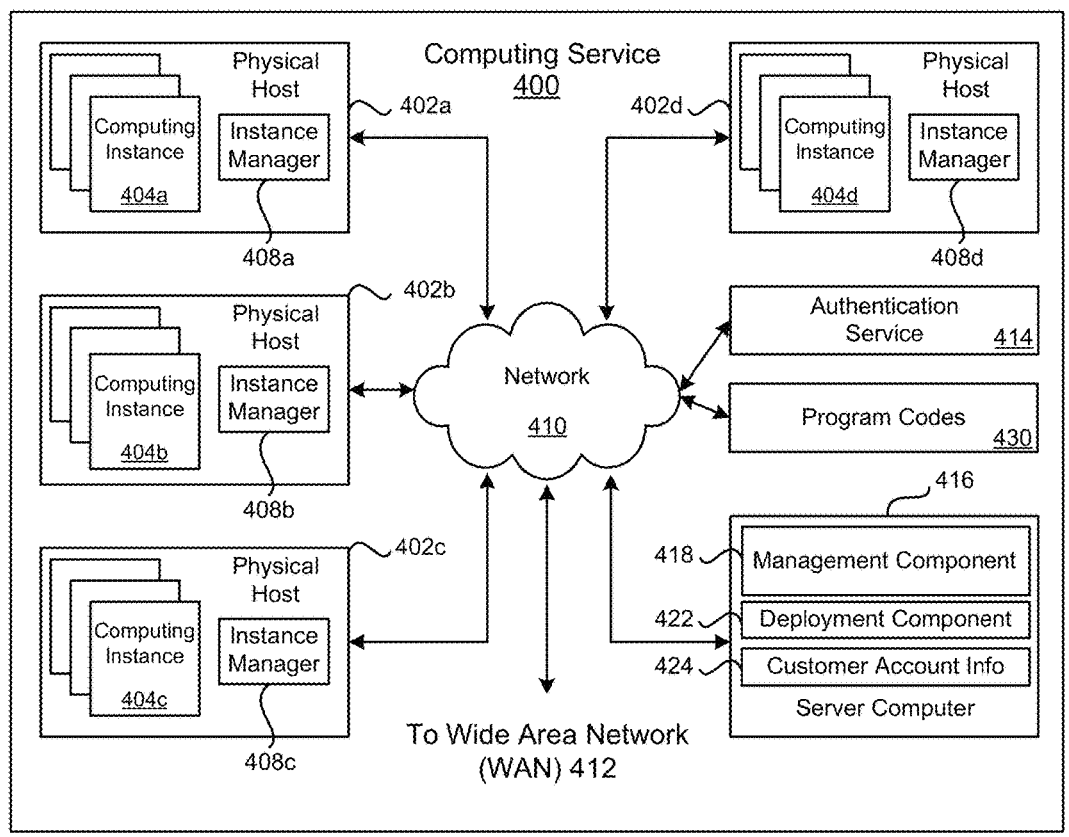
FIG. 4 is a block diagram that illustrates an example computing service environment that includes an authentication service according to an example of the present technology.

FIG. 4 is a block diagram illustrating an example computing service 400 that may be used to execute software services for using a multi-factor authentication process to access or perform services/resources functionality in a computing service environment. In particular, the computing service 400 depicted illustrates one environment in which the technology described herein may be used. The computing service 400 may be one type of environment that includes various virtualized service resources that may be used, for instance, to host computing instances 404a-d on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

Some of the servers may be used for executing a multi-factor authentication process to access services and/or resources or performing one or more services. For example, a server computer 414 may execute a multi-factor authentication process to access services and/or resources or performing one or more services in a service provider environment according to an example of the present technology. In addition, an additional server or group of servers may execute a multi-factor authentication process to access services and/or resources or performing one or more services that may be called from the authentication service 414.

One or more server computers 416 may be reserved to execute software components for managing the operation of the computing service 400 and the computing instances 404a-d. A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code 430 to be executed for configuring computing instances 404a-d, provide cache logic specifying how an application cache may be prepared, and other types of information. The deployment component 422 may utilize the customer-provided configuration and cache logic to configure, initialize, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
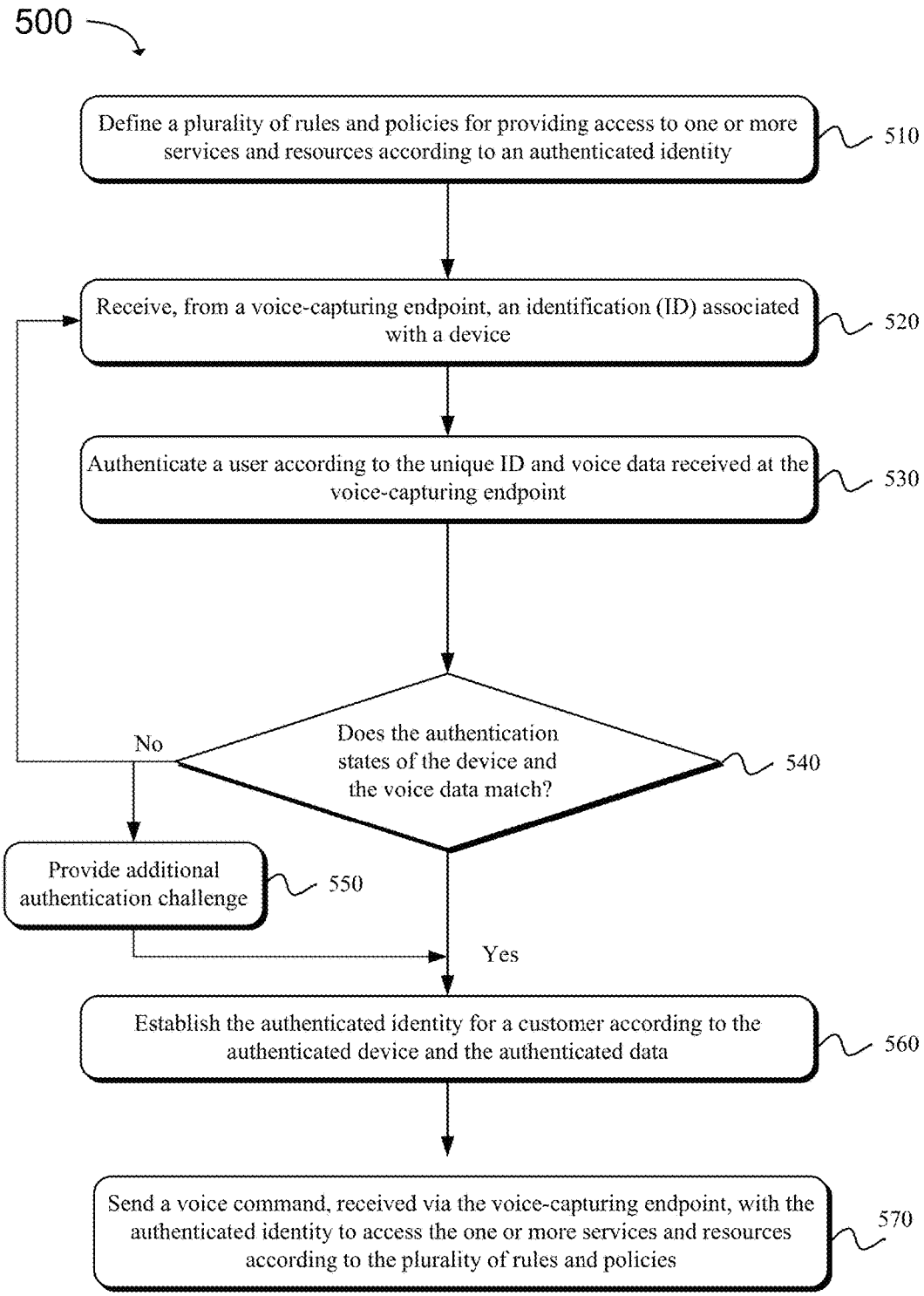
FIG. 5 is a flowchart of an example method for using a multi-factor authentication process to access services for services in a service provider environment according to an example of the present technology.

FIG. 5 is a flowchart of an example method 500 for using a multi-factor authentication process to access services and resource, for example in a service provider environment, according to an example of the present technology. The functionality 500 may be implemented as a method and executed as instructions on a machine, where the instructions are included on at least one computer readable medium or one non-transitory machine-readable storage medium. For example, starting in block 510, one or more rules and/or policies can be defined for allowing access to one or more services and/or resources, for example associated with a service provider environment, according to an authenticated identity. For example, one or more policies and rules may defined according to user specifications. For example, one or more rules may indicate that an authenticated identity for an administrator may have full access to a service or computing resource. Alternatively, an authenticated identify for a temporary user (e.g., a prospective customer on a conference call) may be granted both temporary and limited access to a service and/or resource. In one aspect, the rules and/or policies may indicate that a user having authenticated identity may only access a service and/or resource from a voice-capturing endpoint associated with the authenticated identity of the user. In an additional aspect, the rules and/or policies may indicate that a user having an authenticated identity may access a service and/or resource from one or more voice-capturing endpoints that may not be associated with authenticated identity of the user. An identification (ID) associated with a device may be received from a voice-capturing endpoint, as in block 520. The device may be a mobile device, a laptop, a smart phone, a tablet, a gaming device, a television, a device capable of detecting biometric data, tag, card, badge and/or placard that may include a means for electronic, wireless, and/or near field communication. Alternatively, the voice-capturing endpoint may send information (e.g., a value, a key, a password, etc.) to the mobile device using the wireless beacon to validate that the mobile device is within physical proximity of the voice-capturing endpoint. Voice data received from the voice-capturing endpoint can be authenticated, as in block 530. For example, the voice data may be sent along with an ID of the voice-capturing endpoint to an authentication service. The voice data provided by a customer may be identified and associated with an existing customer associated with the authentication service and/or ID of the voice-capturing endpoint. The ID of the voice-capturing endpoint may be then associated with the identified and authenticated voice data. Alternatively, the voice data may be authenticated by the authentication service by responding to a challenge response. For example, the authentication service may request a pin, a swipe, a password, other biometric data, additional voice data to establish tiered authentication for authenticating the voice data. At block 540, a determination can be made as to whether the authentication state of the mobile device and the authentication state of the voice data match. If no, the method 500 can return to block 520 or can move to block 550. At block 550, an additional authentication challenge may be provided. For example, the authentication challenge may be a challenge response, a request for additional biometric data, a PIN, a code, a swipe or other pattern that may be performed via the device, a defined authentication or security credential, and/or a combination thereof.

If yes at block 540, the operations 500 may move to block 560. The authenticated identity (e.g., an authentication token that identifies a customer with a customer account and a recognized or authenticated device) can be established according to the authenticated mobile device and the authenticated voice data, as in block 560. A command, which has been received via a voice command from the voice-capturing endpoint (e.g., having the voice-capturing endpoint), can be issued with the authenticated identity to access the one or more services and/or resources associated with the service provider environment according to the plurality of rules and/or policies, as in block 570.

To further illustrate, consider the following example of a voice-capturing endpoint that is located within a particular office of employee A. Employee B enters the office of employee A and issues a voice command to the voice-capturing endpoint in the office of employee A. If the authentication service identifies and/or authenticates the voice command received from the voice-capturing endpoint, the authentication service may recognize that Token A' is provided with the voice command (e.g., employee A's cellphone was also left in the office) but identifies the voice command as an employee that is not registered owner with the voice-capturing endpoint (e.g., based on the different voice) and responds with "Employee A is not available right now and will return in 30 minutes." Alternatively, if employee A returns and issues a voice command, such as, for example "What is on my calendar at 4:00 pm", to the voice-capturing endpoint, the voice-capturing endpoint may send the voice command along with Token A' to the authentication service. The authentication service then recognizes that Token A' authenticates employee A (from previous voice data authentication and device recognition and/or authentication). Accordingly, the voice-capturing endpoint may communicate back to the employee A "you have a 4:00 pm interview with candidate X." In another configuration, the authentication service using the voice-capturing endpoint may recognize employee B is associated with an alternative device, such as an alternative voice-capturing endpoint or RFID tag and the voice data for employee B has also been authenticated. Thus, the recognized and/or authenticated device of employee B and the authenticated voice data of employee B may be detected and the voice-capturing endpoint may communicate to employee B "you have an empty calendar." A challenge response may also be presented to a user, such as, for example either employee A or employee B as an additional security and/or authentication procedure (e.g., "what is the PIN associated with your calendar").

In one aspect, the executable instructions of method 500 may also authenticate biometric data received from the mobile device and/or the voice-capturing endpoint (e.g., a voice-capturing endpoint) to establish the authenticated identity and/or determine the mobile device is in proximity to the voice-capturing endpoint. In one aspect, the executable instructions of method 500 may map and/or associate the authenticated identity to the one or more services and/or resources. In one aspect, the executable instructions of method 500 may receive login information from the mobile device to access the one or more services and/or resources; send an authentication request to the mobile device via the voice-capturing endpoint; and/or receive, via voice-capturing endpoint, a response according to the authentication request.

Figure 6:
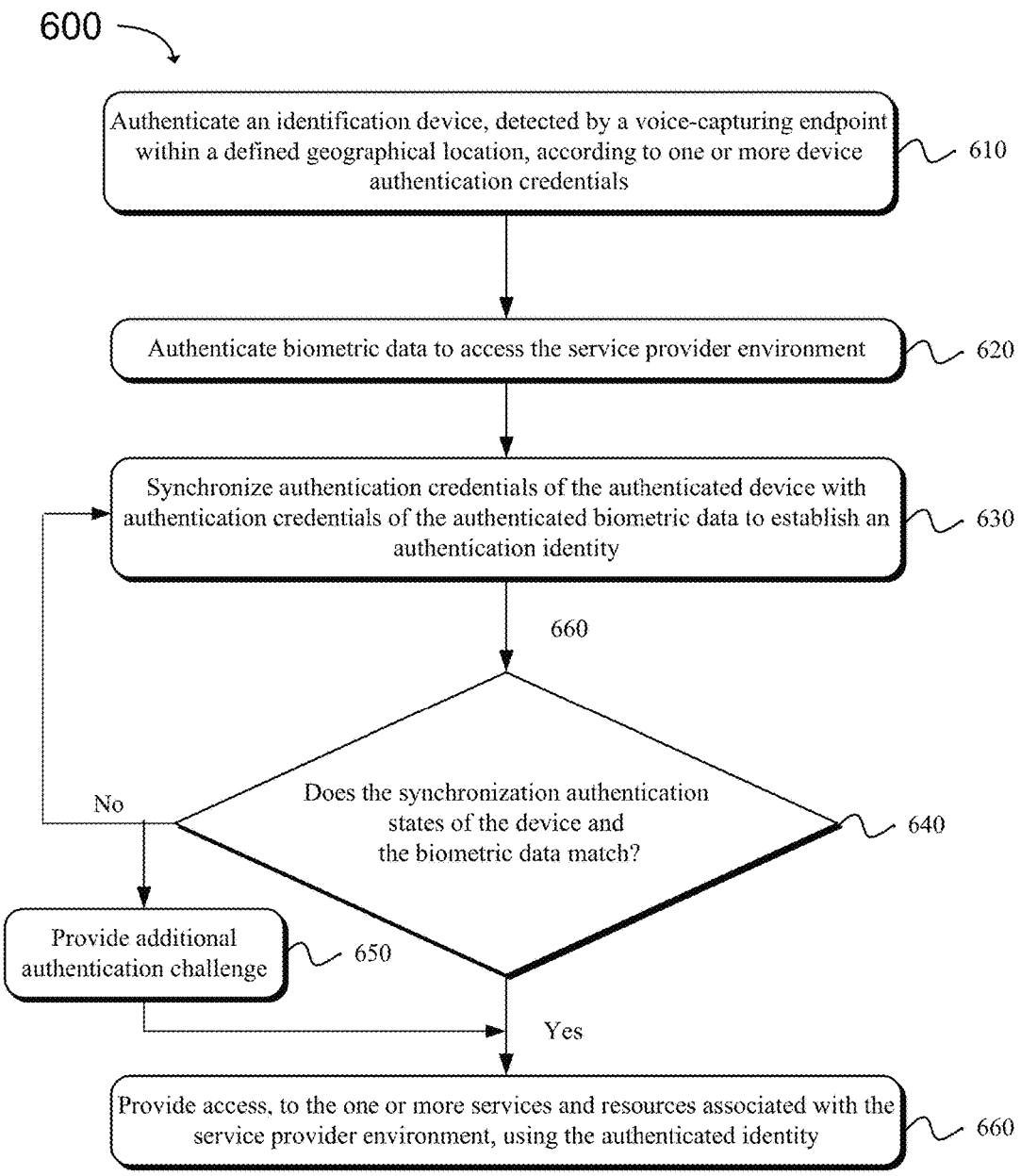
FIG. 6 is a flowchart of an additional example method for using a multi-factor authentication process to access services for services in a service provider environment according to an example of the present technology.

FIG. 6 is a flowchart of an additional example method 600 for using a multi-factor authentication process to access services in a computing service environment according to an example of the present technology. The functionality 600 may be implemented as a method executed as instructions on a machine, where the instructions are included on at least one computer readable medium or one non-transitory machine-readable storage medium. Starting in block 610, an identification device, which has been detected by a voice-capturing endpoint (e.g., a voice-capturing endpoint), as being within a proximity to and/or within defined geographical location, can be authenticated according to one or more mobile device authentication credentials. Biometric data can be authenticated to access the service provider environment, as in block 620. Authentication credentials of the authenticated mobile device can be synchronized with authentication credentials of the authenticated biometric data to establish an authentication identity, as in block 630. In one aspect, the authentication identity can be returned to the mobile device and the voice-capturing endpoint. At step 640, a determination can be executed to determine whether the authentication credentials of the authenticated mobile device is synchronized with authentication credentials of the authenticated biometric data. If no, the method 600 can return to block 630 or can move to block 650. At block 650, an additional authentication challenge may be provided. For example, the authentication challenge may be a challenge response, a request for additional biometric data, a PIN, a code, a pattern that may be performed via the device, a defined authentication or security credential, and/or a combination thereof. If yes at block 640, the method 600 can move to block 650. At block 660, access to the one or more services and/or resources associated with the service provider environment can be provided using the authenticated identity (e.g., an authentication identity token that identifies a customer with a customer account and a recognized or authenticated device).

Figure 7:
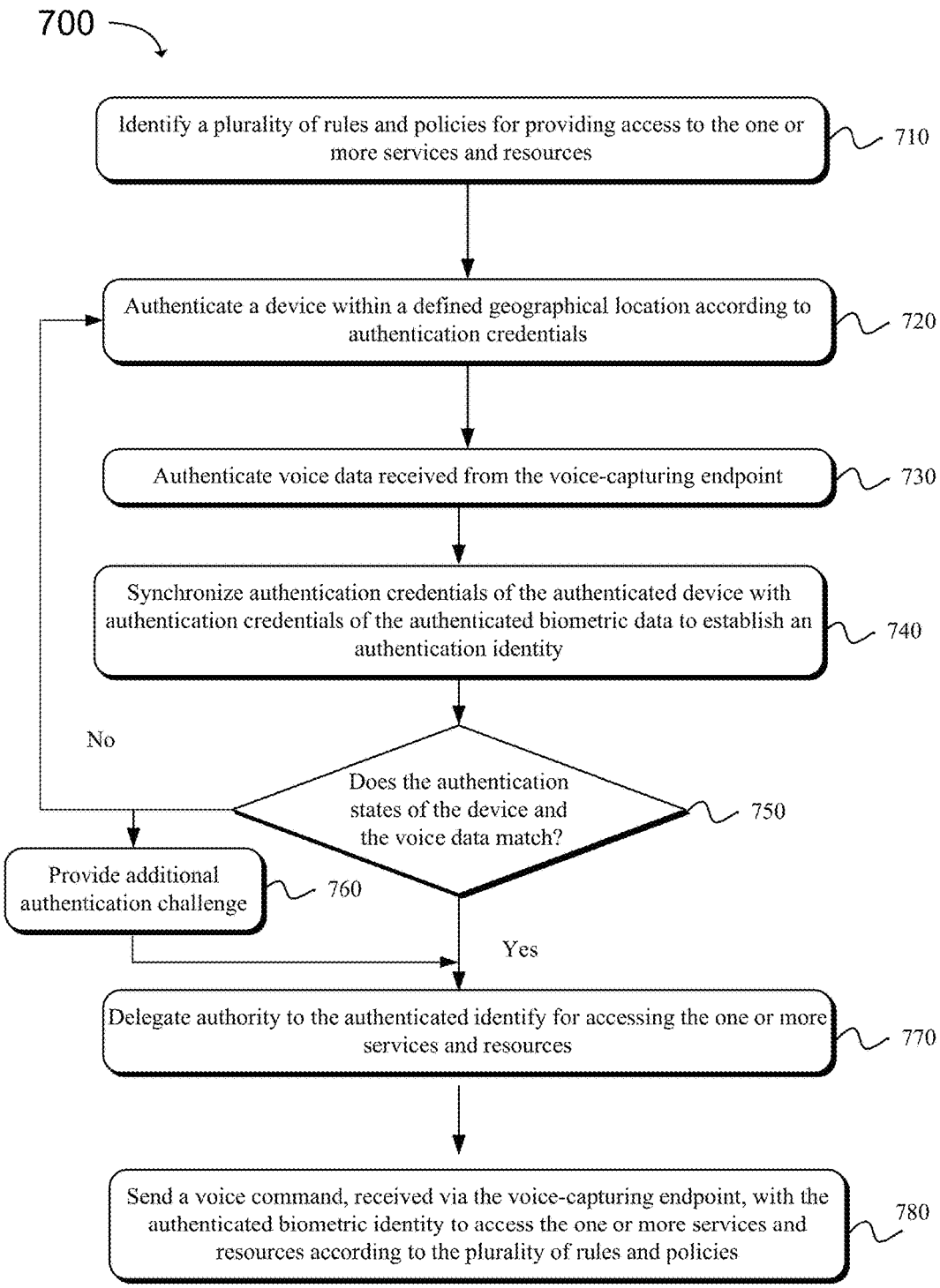
FIG. 7 is a flowchart of an additional example method for using a multi-factor authentication process using services and resource policy rules to access services for services in a service provider environment according to an example of the present technology.

FIG. 7 is a flowchart of an additional example method 700 for using a multi-factor authentication process to access a computing service environment according to an example of the present technology. The functionality may be implemented as a method executed as instructions on a machine, where the instructions are included on at least one computer readable medium or one non-transitory machine-readable storage medium. Starting in block 710, one or more rules and/or policies can be identified for providing access to the one or more services and/or resources (which may be associated with a service provider environment). A device within a defined geographical location may be authenticated according to authentication credentials, as in block 720. Biometric data can be authenticated to access the service provider environment, as in block 730. An authentication state of the authenticated device can be synchronized with the authenticated biometric data to establish an authenticated biometric identity, as in block 740. At block 750, a determination may be made as to whether the authentication state of the device and the authentication state of the authenticated biometric data match. If no, the method 700 can return to block 720 or can move to block 760. At block 760, an additional authentication challenge may be requested. For example, the authentication challenge may be a challenge response, a request for additional biometric data, a PIN, a code, a pattern that may be performed via the device, a defined authentication or security credential, and/or a combination thereof. If yes at block 750, the method 700 can move to block 770. Authority can be delegated to the authenticated identity for accessing the one or more services and/or resources, as in block 770. A request, received via a voice command at the voice-capturing endpoint, may be issued with the authenticated biometric identity to access the one or more services and/or resources according to the one or more rules and/or policies, as in block 780.

In one aspect, in conjunction with and/or as part of at least one block of FIGS. 5-7, the operations of 500, 600, and/or 700 may include each of the following. The operations of 500, 600, and/or 700 may include defining a plurality of rules and/or policies for providing access to the one or more services and/or resources associated with the service provider environment using the authenticated identity. Further, operations of 500, 600, and/or 700 may include receiving a voice command from the voice-capturing endpoint, with the authenticated identity to access the one or more services and/or resources associated with the service provider environment according to the plurality of rules and/or policies. The biometric data may further include voice data, fingerprint data, facial recognition, or retina data.

In one aspect, the operations of 500, 600, and/or 700 may compare current biometric data to a sample of previously acquired biometric data to perform authentication, and/or provide an authenticated confidence level indication with the authenticated identity. That is, the authenticated confidence level can be a ranking, a percentage, and/or a collection of statistical data measuring the accuracy of verifying the authenticated identity. The authenticated confidence level can be used as an additional multi-factor authentication process, as described herein, and/or be communicated to one or more customers. The operations of 500, 600, and/or 700 may further determine whether or not the mobile device is in physical proximity (e.g., a defined and/or selected area within a physical proximity) to the voice-capturing endpoint by the mobile device receiving an identifier from the communication beacon. In one aspect, operations of 500, 600, and/or 700 may associate the authenticated identity to each one of the one or more services and/or resources; receive login information from the mobile device to access the one or more services and/or resources; send an authentication request to the mobile device via the voice-capturing endpoint; and/or receive, via voice-capturing endpoint, a response according to the authentication request.

In one aspect, operations of 500, 600, and/or 700 may include provide one or more authentication challenges via the voice-capturing endpoint; receive an authentication challenge voice data response via the voice-capturing endpoint; determine the authentication challenge voice data response correlates to the one or more authentication challenges, and/or determine the authentication challenge voice data response correlates to authentication data previously stored for the authentication challenge.

In one aspect, operations of 600, 700, and/or 700 may include sending, using the program code, the call function using the security data template to query the target resource prior to plotting data in the dashboard graph. An updated templated data response associated with the call function can be received according to changing data of the target resource. An updated templated data response associated with the call function may be received according to changing data of the target resource.

In one aspect, the operations of 600, 700, and/or 700 may include dynamically plotting in one or more widgets of the dashboard graph the templated data response according to changing data of the target resource located in one of an internal computing network of the monitoring service or an external computing network. Also, social media information may be incorporated into the templated data response in the dashboard graph.

In one aspect, the service provider environment may include one or more services executing on computing instances, servers or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 8:
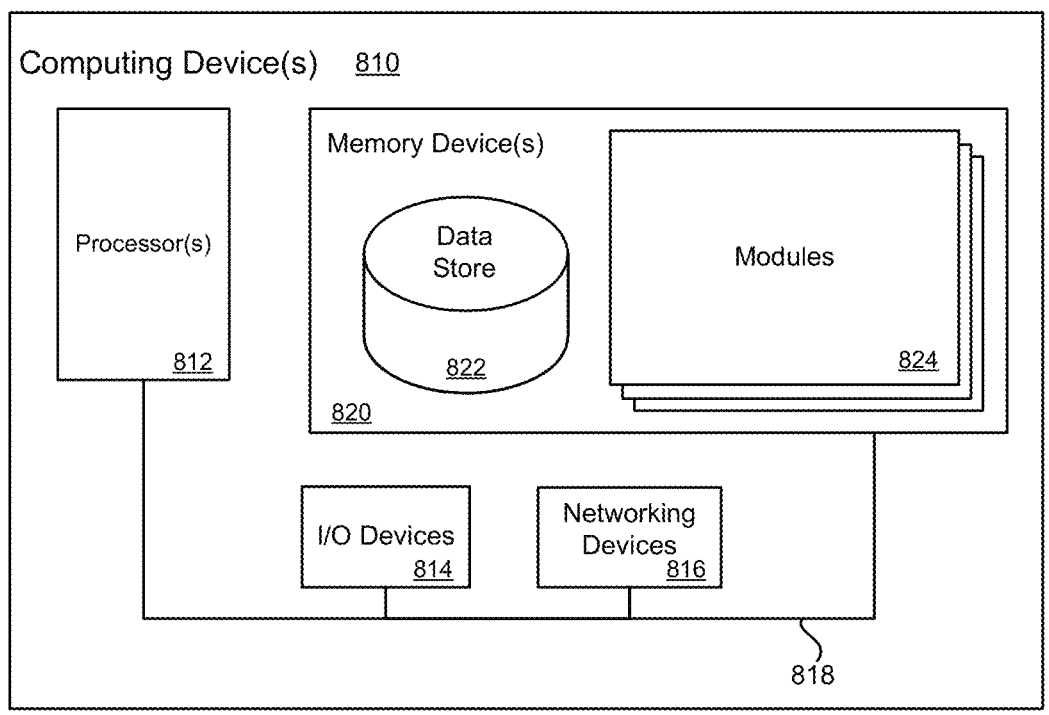
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the Internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid-state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for using a multi-factor authentication process to access a voice-based service comprising:
   a voice-capturing endpoint in communication with the voice-based service operating in a service provider environment; and
   one or more computing devices in the service provider environment in communication with the voice-based service, wherein the one or more computing devices include instructions that when executed;
   register a plurality of policies for allowing the access to the voice-based service operating in the service provider environment, wherein the access to the voice-based service is based at least in part on an authenticated identity;
   receive an identifier (ID) from the voice-capturing endpoint, the ID associated with a device or user within proximity to the voice-capturing endpoint;
   generate the authenticated identity based at least in part on authenticating the user or the device and voice data received from the voice-capturing endpoint;
   send the authenticated identity to the voice-capturing endpoint;
   receive a voice command with the authenticated identity, via the voice-capturing endpoint, to access the voice-based service operating in the service provider environment; and
   determine, based at least in part on the authenticated identity and the voice command, whether to execute the voice command according to at least one of the plurality of policies to allow the access to the voice-based service.

2. The system of claim 1, wherein the executable instructions further include authenticating biometric data received from at least one of the device or the voice-capturing endpoint to establish the authenticated identity, wherein the authenticated identity includes an authentication token and provides access to an account or enables a user to be an authenticated user.

3. The system of claim 1, wherein the executable instructions further determine the device is in proximity to the voice-capturing endpoint.

4. The system of claim 1, wherein the executable instructions further map the authenticated identity to the voice-based service.

5. The system of claim 1, wherein the executable instructions further:
   receive account credentials from the device to access the voice-based service;
   send an authentication request to the device via the voice-capturing endpoint; and
   receive, via voice-capturing endpoint, a response according to the authentication request.

6. A method, using at least one processor and memory configured with executable instructions, comprising:
   registering a plurality of policies for allowing access to one or more services operating in a service provider environment, the access based at least in part on authentication information;
   receiving an identifier (ID) from a voice-capturing endpoint in communication with the one or more services, wherein the ID is associated with a device or a user within proximity to the voice-capturing endpoint;
   generating the authentication information based at least in part on authenticating the user or the device and voice data received from the voice-capturing endpoint;
   sending the authentication information to the voice-capturing endpoint;
   receiving a voice command and the authentication information, via the voice-capturing endpoint, to access the one or more services operating in the service provider environment;
   and
   determining, based at least in part on the voice command and the authentication information, whether to execute the voice command according to at least one of the plurality of policies to allow the access to the one or more services.

7. The method of claim 6, further comprising receiving biometric data from the device and associating the biometric data with the ID from the voice-capturing endpoint, the ID associated with the device or the user to generate the authentication information.

8. The method of claim 7, further comprising delegating authority to a user or the device associated with the ID for providing the access to the one or more services operating in the service provider environment.

9. The method of claim 7, further comprising receiving a voice command, received from the voice-capturing endpoint, with the authentication information to access the one or more services associated with the service provider environment according to a plurality of policies.

10. The method of claim 7, wherein the biometric data further include voice data, fingerprint data, facial recognition, or eye data.

11. The method of claim 6, further comprising comparing current biometric data to a sample of previously acquired biometric data to generate the authentication information.

12. The method of claim 6, further comprising providing an authenticated confidence level indication with the authentication information.

13. The method of claim 6, further comprising determining the device is in physical proximity to the voice-capturing endpoint by the device receiving an identifier from a communication beacon.

14. The method of claim 6, further comprising associating the authentication information to each one of the one or more services.

15. The method of claim 6, further comprising:
   receiving login information from the device to access the one or more services;
   sending an authentication request to the device via the voice-capturing endpoint; and
   receiving, via voice-capturing endpoint, a response according to the authentication request.

16. The method of claim 6, further comprising:
   providing one or more authentication challenges via the voice-capturing endpoint;
   receiving an authentication challenge voice data response via the voice-capturing endpoint; and
   determining the authentication challenge voice data response correlates to the one or more authentication challenges.

17. At least one non-transitory machine readable storage medium having instructions embodied thereon for using an authentication process to access a computing service environment, the instructions when executed cause one or more processors to:

identify a plurality of policies for providing access to one or more services associated with a service provider environment;
authenticate a device, identified using a voice-capturing endpoint as being located within a geographical location, according to one or more device authentication credentials;
authenticate biometric data;
synchronize authentication states of the authenticated device with the authenticated biometric data to establish an authenticated biometric identity;
delegate authority to the authenticated biometric identity for accessing the one or more services associated with the service provider environment;
receive a voice command, received via the voice-capturing endpoint, and the authenticated biometric identity to access the one or more services associated with the service provider environment according to the plurality of policies; and
determine, based at least in part on the authenticated biometric identity and the voice command, whether to execute the voice command according to at least one of the plurality of policies to allow access to the one or more services.

18. The at least one non-transitory machine readable storage medium of claim 17, wherein the instructions when executed cause the one or more processors to further associate the authenticated biometric identity to each one of the one or more services.

19. The at least one non-transitory machine readable storage medium of claim 17, wherein the instructions when executed cause the one or more processors to further compare current biometric data to a sample of previously acquired biometric data, wherein the current biometric data and the previously acquired biometric data further include voice data, fingerprint data, facial recognition, or retina data.

20. The at least one non-transitory machine readable storage medium of claim 17, wherein the instructions when executed cause the one or more processors to further execute the one or more services associated with the service provider environment according to the voice command, received via the voice-capturing endpoint, having the authenticated biometric identity and the authenticated biometric identity is a voice print.

* * * * *